US006848110B2

(12) United States Patent
Salmon (10) Patent No.: US 6,848,110 B2
(45) Date of Patent: Jan. 25, 2005

(54) AUTOMATIC FEATURE AUGMENTATION FOR COMPONENT BASED APPLICATION PROGRAMMING INTERFACES

(75) Inventor: Glen E. Salmon, Amesbury, MA (US)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 09/747,751

(22) Filed: Dec. 22, 2000

(65) Prior Publication Data

US 2002/0083212 A1 Jun. 27, 2002

(51) Int. Cl.[7] ............................................... G06F 9/00
(52) U.S. Cl. ....................................................... 719/328
(58) Field of Search ........................... 719/328; 709/328

(56) References Cited

U.S. PATENT DOCUMENTS

| | | | |
|---|---|---|---|
| 5,265,252 A | 11/1993 | Rawson, III et al. ........ | 395/700 |
| 5,339,432 A | 8/1994 | Crick .......................... | 395/700 |
| 5,465,364 A | 11/1995 | Lathrop et al. .............. | 395/700 |
| 5,491,813 A | 2/1996 | Bondy et al. ................ | 395/500 |
| 5,696,970 A | 12/1997 | Sandage et al. ............. | 395/681 |
| 5,715,459 A | 2/1998 | Celi, Jr. et al. .............. | 395/681 |
| 5,745,762 A | 4/1998 | Celi, Jr. et al. .............. | 395/681 |
| 5,815,707 A | 9/1998 | Krause et al. ............... | 395/681 |
| 5,896,533 A | * 4/1999 | Ramos et al. ................ | 709/217 |
| 5,910,180 A | 6/1999 | Flory et al. .................. | 709/301 |
| 5,964,843 A | 10/1999 | Eisler et al. ................. | 709/300 |
| 5,974,470 A | * 10/1999 | Hammond ................... | 709/331 |
| 5,991,822 A | 11/1999 | Mealey et al. ............... | 709/301 |
| 6,006,279 A | 12/1999 | Hayes ......................... | 709/302 |
| 6,253,257 B1 | * 6/2001 | Dundon ....................... | 709/331 |
| 6,496,833 B1 | * 12/2002 | Goldberg et al. ............ | 707/102 |

OTHER PUBLICATIONS

"MERANT Teams with IBM to Enhance WebSphere with Market–Leading Data Access Technology". Press Release [online]. MERANT, 2000 [retrieved on Aug. 11, 2000]. Retrieved from the internet <URL: http://www.intersolv.com/resource_center/press/release/071800.asp>.

(List continued on next page.)

Primary Examiner—Meng-Al T. An
Assistant Examiner—LeChi Truong
(74) Attorney, Agent, or Firm—Hamilton, Brook, Smith & Reynolds, P.C.

(57) ABSTRACT

Automatically augmenting functionality in an application programming interface ("API") is provided by receiving from an application a request for functionality to be fulfilled by a first component implementing at least a portion of the functionality within the application programming interface. The first component is queried for the requested functionality. If an indication that the first component does not implement the requested functionality is received, the a search for an augmentation component that implements the requested functionality is initiated. If an augmentation component supplying the required functionality is found, the augmentation component is loaded to fulfill the request for functionality in place of the first component and used to respond to the request for functionality. Augmentation components provide a subset of the API's required functionality, thereby removing a limitation from API components (i.e., functionality completeness). Augmentation components may also be used to provide new functionality for the API to all existing components (i.e., functionality enhancement).

19 Claims, 5 Drawing Sheets

OTHER PUBLICATIONS

Egility I–Solutions. [online]. MERANT [retrieved on Aug. 11, 2000]. Retrieved from the internet <URL: http://www.merant.com/solutions/i_solutions.asp>.

MERANT Egiligy Unified Information Access. [online]. MERANT [retrieved on Aug. 11, 2000]. Retrieved from the internet <URL: http://www.merant.com/solutions/I_uia.asp>.

MERANT Products: Products Overview. [online]. MERANT [retrieved on Aug. 11, 2000]. Retrieved from the internet <URL: http://www.merant.com/products/>.

DataDirect Products: A Practical Guide to ADO and OLE DB. [online]. MERANT [retrieved on Aug. 11, 2000]. Retrieved from the internet <URL: http://www.merant.com/products/datadirect/shared/techdocs/wp/wp_dd-oledb.asp>.

DataDirect Products. [online]. MERANT [retrieved on Aug. 11, 2000]. Retrieved from the internet <URL: http://www.merant.com/products/datadirect/ddprods.asp>.

DataDirect Products:DataDirect Connect Integrator Features [online]. MERANT [retrieved on Aug. 11, 2000]. Retrieved from the internet <URL: http://www.merant.com/products/datadirect/odbc/ integrator/features.asp>.

DataDirect Products: Connect Integrator. Product Overview [online]. MERANT [retrieved on Aug. 11, 2000]. Retrieved from the internet <URL: http://www.merant.com/products/datadirect/odbc/integrator/overview.asp>.

DataDirect Products: DataDirect Connect ODBC. Product Overview [online]. MERANT [retrieved on Aug. 11, 2000]. Retrieved from the internet <URL: http://www.merant.com/products/datadirect/odbc/Connect/overview.asp>.

DataDirect Products: DataDirect Connect ODBC. Factsheet [online]. MERANT [retrieved on Aug. 11, 2000]. Retrieved from the internet <URL: http://www.merant.com/products/datadirect/odbc/Connect/factsheet.asp>.

"Merant Egility™—The fastest way to e-enable your business", MERANT White Paper, 1999.

* cited by examiner

AUTOMATIC FEATURE AUGMENTATION FOR COMPONENT BASED APPLICATION PROGRAMMING INTERFACES

BACKGROUND OF THE INVENTION

This invention relates generally to enterprise integration of software application programs using application programming interfaces, and more specifically to automatically augmenting features for component based application programming interfaces.

Enterprise application development allows for the building of software applications having a unified model that present a coherent and consistent interface across a diverse set of backend data storage systems. Enterprise application development environments typically support "codeless", as well as programmatic, development. Codeless development typically utilizes a forms-based platform for the development of applications. Programmatic development typically utilizes an application program interface ("API") for the development of applications. Enterprise applications can be developed using either approach or a combination of approaches.

Enterprise applications developed today have access to diverse sets of data, but only through the use of a native product API or through a common API that is coded to the least common denominator functionality available among the diverse data sets.

APIs define a set of routines usable by an application program to invoke the functionality implemented within the components supporting the API. Example native APIs include the Lotus Notes API for accessing Lotus Notes databases, the IBM DB2 databases. Example common APIs include the Lotus Connector API and Microsoft's ActiveX Data Objects, both provide a high-level, component based, interface for enterprise application developers.

The Lotus Connector V3.0 API presents a common set of application program calls using a set of "connectors" (components) written to interface with specific data sets. The Lotus Connector API architecture is optimized to support high speed operations with enterprise-scale functionality. Lotus Connector API's provides performance relating to both quantity of data and speed of data movement, as a result, Lotus Connector API support libraries are tuned for performance. The Lotus Connector API allows use of product-specific capabilities, allowing developers of connectors to support the specific capabilities of external products. For example, the Lotus Notes Connector supports response hierarchies, file attachments, and other Notes-specific functionality, while the Oracle Connector supports the Oracle array transfer feature. The Lotus Connector API is platform-independent and is available on multiple server based platforms. The Lotus Connector API is also independent of the data format being accessed, allowing access not only to standard database formatted information (e.g., Lotus Notes databases and relational databases), but data from other sources such Enterprise Resource Planning ("ERP") systems, directories, transaction systems, and other data providers. The Lotus Connector API avoids, when reasonable, dependence on programming language specific constructs in order to allow the use of the Lotus Connector API from programming languages other than C (e.g., LotusScript and Java).

Microsoft's ActiveX Data Objects ("ADO") is a single, common application interface for accessing data based upon Object Linking and Embedding Data Base ("OLE DB"). OLE DB is a set of interfaces designed to provide access to all data, regardless of type, format or location by effectively "componentizing" database and related data processing functionality. The OLE DB architecture provides for components such as direct data access interfaces, query engines, optimizers, business rules and transaction managers. The fundamental paradigm of ADO and OLE DB is to work at the rowset or table level. OLE DB employs open database connectivity ("ODBC") for providing universal data access to SQL-relational data.

SUMMARY OF THE INVENTION

Once a common API is defined it is difficult to change the definition of the API without requiring all existing enterprise applications to be re-written. This is an expensive and time consuming process. Currently, components for enterprise APIs must be written to support the entire set of desired functionality, or some requests for functionality will fail. Additionally, based upon the component nature of existing enterprise APIs, common solutions can not be shared across existing components.

Thus, an effective technique for solving the problems of supplying and sharing functionality in application programming interfaces is required. Accordingly, the present invention provides for automatically augmenting functionality in an application programming interface by receiving from an application a request for functionality to be fulfilled by a first component implementing at least a portion of the functionality within the application programming interface. The first component is queried for the requested functionality. If an indication that the first component does not implement the requested functionality is received, then a search for an augmentation component that implements the requested functionality is initiated. If an augmentation component supplying the required functionality is found, the augmentation component is loaded to fulfill the request for functionality in place of the first component and is used to respond to the request for functionality.

Augmentation components provide a subset of the API's required functionality, thereby removing a limitation from API components (i.e., functionality completeness). For example an augmentation component may provide data definition management functionality for a database component.

Augmentation components may also be used to provide new functionality for the API to all existing components (i.e., functionality enhancement). For example, a functionality enhancement that provides thread management for non-thread safe components or functionality that returns a count of data items retrieved from a query, may be implemented as an augmentation component.

Augmentation components fits between the API and its component, providing functionality completeness or functionality enhancement. The application is not aware that the augmentation component is loaded, the application simply requests the support of the API and the API loads the augmentation module, certain subsequent API calls for a subset of functionality are then completed by the augmentation component.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
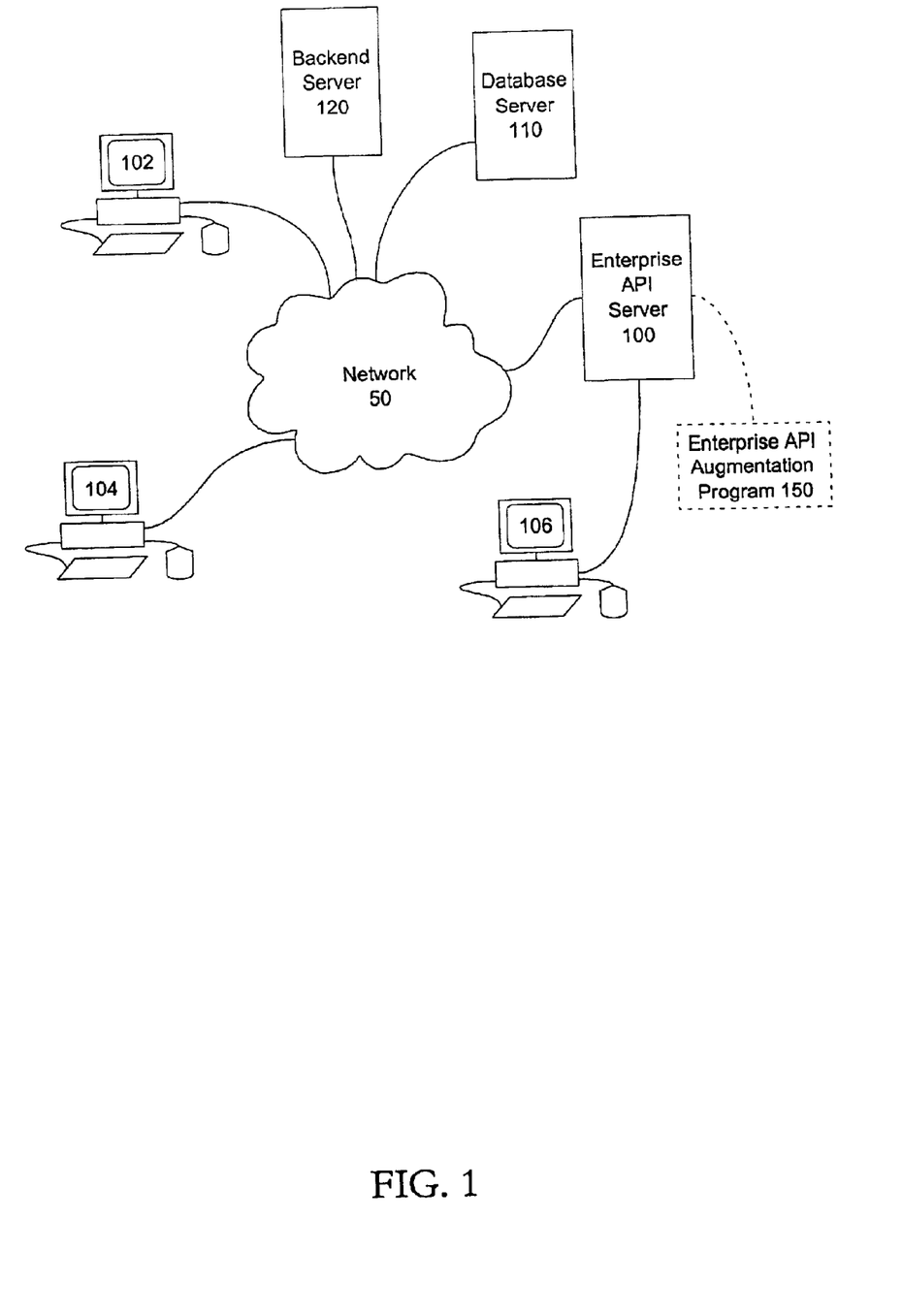
FIG. 1 illustrates a computer system on which an embodiment of the present invention is implemented.

FIG. 1 illustrates a computer system on which an embodiment of the present invention is implemented. Client computers (102, 104, 106) provide processing and input/output devices in a system providing enterprise applications. Server computers (110, 120) are also linked to a network 50 and contain software providing application programming interfaces for various backend/database services. Enterprise API server 100 provides an enterprise API for users of Backend server 120 and Database server 110. The enterprise API can be augmented using API Augmentation Program 150. Network 50 can be part of the Internet, the worldwide collection of computers, networks and gateways that use the TCP/IP suite of protocols to communicate with one another. The Internet provides a backbone of high-speed data communication lines between major nodes and host computers, consisting of thousands of commercial, government, educational, and other computer systems, that route data and messages.

Figure 2:
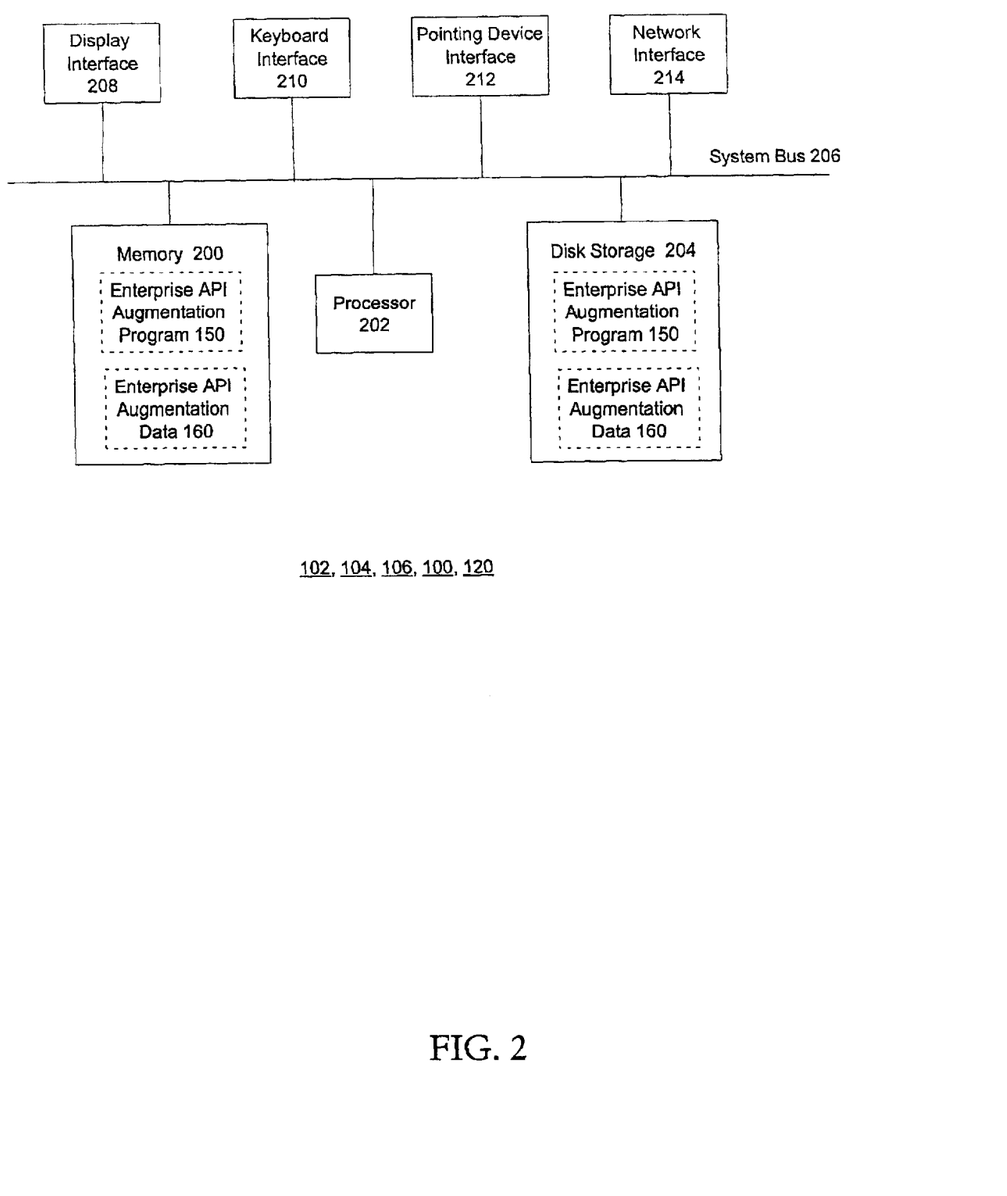
FIG. 2 shows the internal structure of a computer of FIG. 1.

FIG. 2 illustrates the internal structure of a computer of FIG. 1. FIG. 2 illustrates client computer (102, 104, 106) and the server computers (100, 110, 120). The client computers (102, 104, 106) and server computers (100, 110, 120) contain a system bus 206; a bus is a set of hardware lines used for data transfer among the components of a computer system. A bus is essentially a shared channel that connects different parts of the system (e.g., processor, disk-drive controller, memory, and input/output ports) and enables the different parts to transfer information. Attached to system bus 206 is display interface 208, which allows display devices to communicate with other components on system bus 206. Keyboard interface 210 and pointing device interface 212 are also attached to system bus 206 and allow various input devices to communicate with other components on system bus 206. Network interface 214 provides a link to an external network (e.g., network 50) allowing processes running on a client computer (102, 104, 106) to communicate with a server computer (100, 110, 120) connected to network 50.

Enterprise API Augmentation Program 150 uses Enterprise API Augmentation Data 160 to provide automatically augmented features for component based application programming interfaces according to an embodiment of the present invention. A memory 200 stores computer software instructions (e.g., Enterprise API Augmentation Program 150) and data structures (Enterprise API Augmentation Data 160) used to implement an embodiment of the present invention for automatically augmenting functionality in an application programming interface. A disk storage device 204 is provided for non-volatile storage on computers (102, 104, 106, 100, 110, 120) to store, for example API Augmentation Program 150 and Enterprise API Augmentation Data 160. A processor 202 executes instructions and accesses data stored in memory 200, allowing the networked computers (102, 104, 106, 100, 110, 120) to provide automatically augmented features for component based application programming interfaces according to an embodiment of the present invention.

Figure 3A:
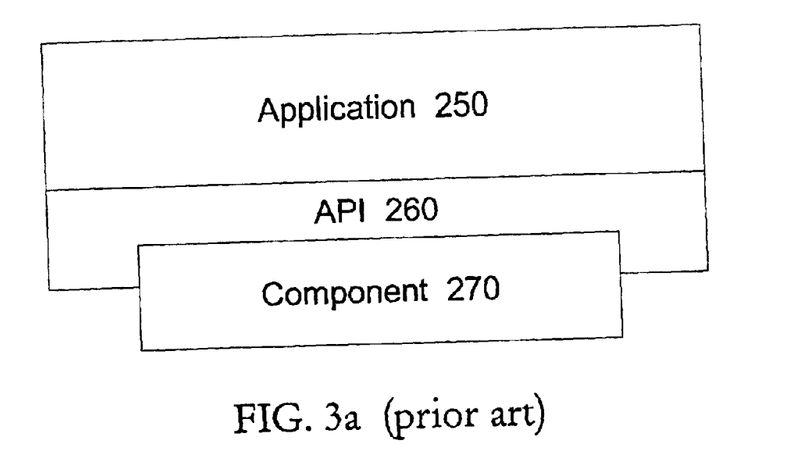
FIG. 3a is a block diagram showing a non-augmented component API configuration as disclosed in the prior art.

FIG. 3a is a block diagram showing a non-augmented API component configuration as disclosed in the prior art. Application 250 is an enterprise application accessing functionality supplied by Component 270 by using API 260. This a conventional approach and exhibits various problems. Whenever the definition of API 260 changes, all Components 270, must be rewritten to comply to the newly defined API. Components 270 are often supplied by vendors other than the vendor of API 260. This makes it more difficult to compel component vendors to comply with the new definition of API 260. Additionally, not only are the component venders often different than the API vendor, but there are often multiple different component vendors. Coordinating a new release of API 260 entails convincing all the component vendors to produce rewritten Components 270 that comply with the new definition of API 260, or having the Enterprise API vendor write the components themselves.

Figure 3B:
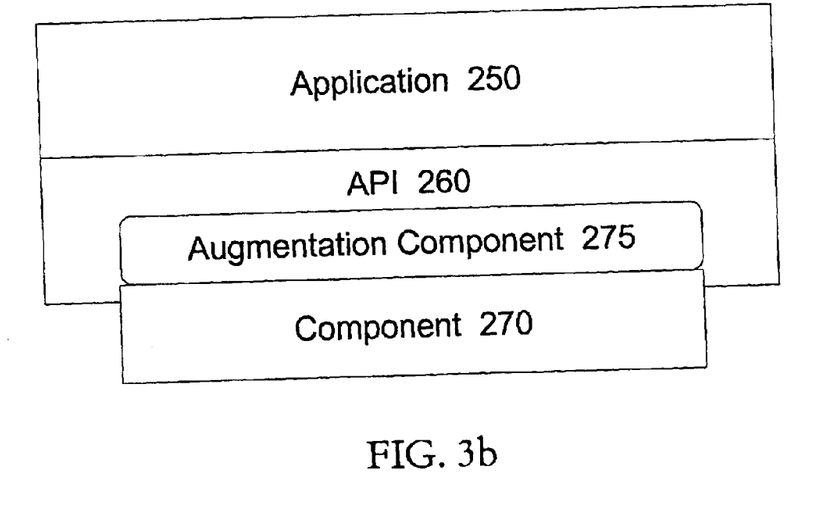
FIG. 3b is a block diagram showing an augmented component API configuration of the present invention.

FIG. 3b is a block diagram showing an augmented API component configuration of the present invention. Application 250 is again an enterprise application requesting functionality from API 260. In this configuration Components 270 of API 260 are augmented by Augmentation Component 275. Augmentation Component 275 may supply missing functionality for a specific Component 270 (functionality completeness) or it may provide a common functionality for all Components 270 (functionality enhancement) of API 260. The effects of redefining API 260 can now be subsumed by Augmentation Component 275. A subset of functionality (missing functionality) can be supplied by Augmentation Component 275. Additionally, common functionality for all components can be supplied by Augmentation Component 275. Management of Augmentation Component 275 is accomplished using Enterprise API Augmentation Program 150.

Figure 4:
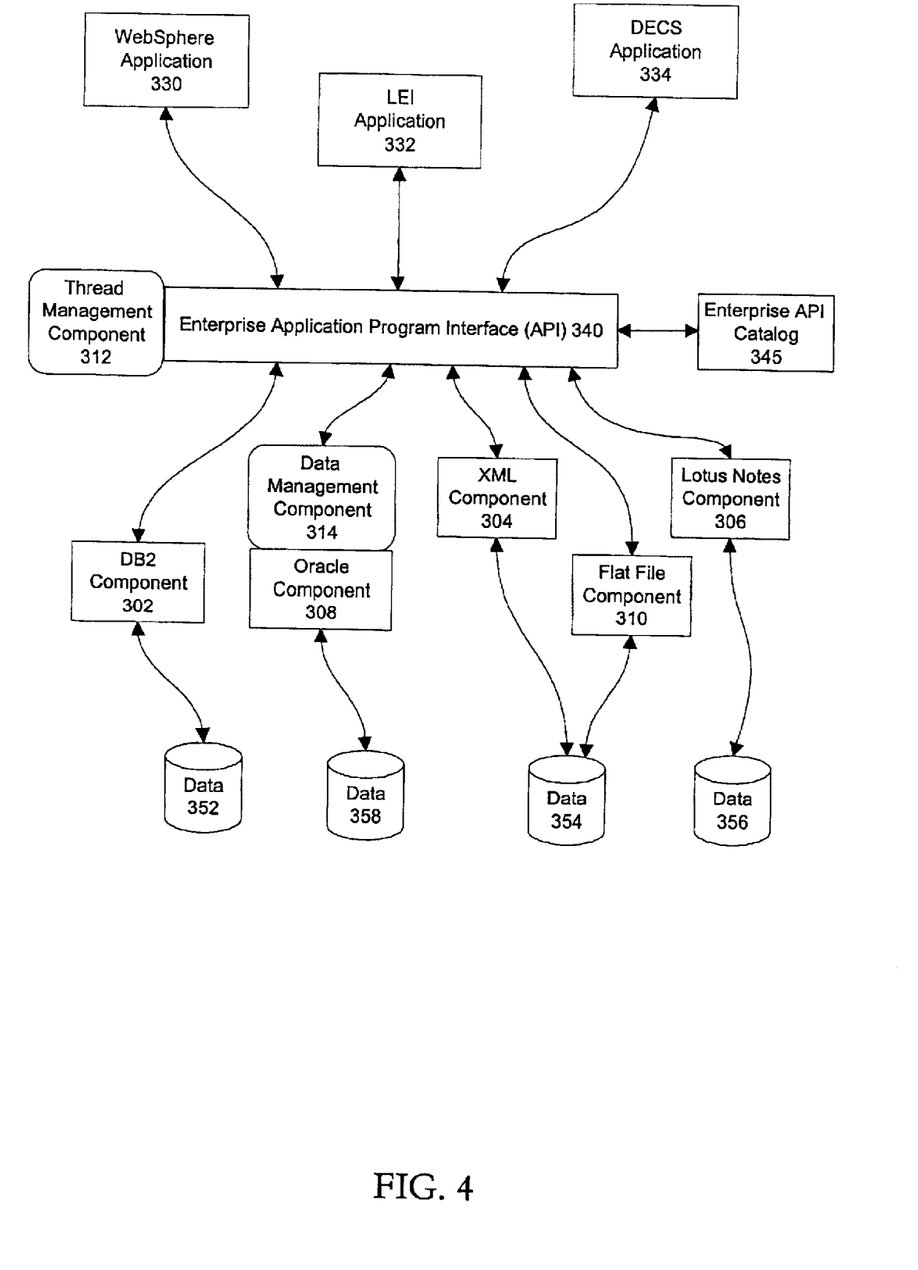
FIG. 4 is a block diagram showing computer software elements as configured in an embodiment of the present invention.

FIG. 4 is a block diagram showing computer software elements as configured in an embodiment of the present invention. Enterprise applications (330, 332, 334) access data (352, 354, 356, 358) by way of components (302, 304, 306, 308, 310, 312, 314) using Application Programing Interface (340). Elements 302, 304, 306, 308 and 310 (shown as rectangles in FIG. 4) represent components. Elements 312 and 314 (shown as rounded-rectangles) represent augmented components.

Enterprise applications, for example IBM Websphere Application 330, Lotus Enterprise Integrator ("LEI") Application 332 and Domino Enterprise Connection Services ("DECS") Application 334 allow users to implement enterprise-wide computer solutions. IBM Websphere Application 330 is a general purpose Java application server that can be used to build a wide array of eBusiness applications. Websphere provides a robust Java execution environment that can be utilized by Lotus Domino. DECS Application 334 provides an easy-to-use forms-based interface that lets users integrate connectivity to external data from Lotus Domino applications. With DECS, users work with a non-programmatic template application to make external source data an integrated part of any Lotus Domino application. LEI Application 332 is a multi-tasking data distribution server with an administrative application designed to support enterprise scale data integration and transfer volumes. It provides high performance, and scalable exchange of data via Lotus Domino Connectors.

Enterprise data is stored in various formats on data storage devices (352, 354, 356, 358). In one preferred embodiment, Lotus Notes data 356 is accessed by a Lotus Notes Component 306. The Lotus Notes Component 306 understands how to read and write data in Lotus Notes format and provides an API for programmatic access to that data. The DB2 Component 302 accesses data formatted as DB2 database records on data storage device 352. Correspondingly, XML and flat file data is stored on data storage device 354 and accessed by XML Component 304 and Flat File Component 310. These components provide an API for programmatic access to the data formats that they respectively support. The Oracle Component 308 accesses data formatted as Oracle database records on data storage device 358.

Enterprise data may be accessed using an Enterprise API 340. Enterprise API 340 functions by using underlying components (302, 304, 306, 308, 310) to provide features and access the variety of data stored on data storage devices (352, 354, 356, 358). An example Enterprise API 340 is the Lotus Connector V3.0 API. Enterprise API 340 requires components to be written to provide some predetermined functionality. The Enterprise 340 API defines required entry points and the components implement the set of entry points. In the prior art, a component would not function properly if it did not support the entire set of common functionality defined by the Enterprise API 340. Additionally, any required changes to support newly defined functionality of the Enterprise API 340 would require rewriting all existing components. The present invention provides for adding functionality to an existing component to complete its (missing) functionality such that it supports the predefined Enterprise API entry points. This is referred to as "functionality completeness augmentation". The present invention also provides for adding new functionality to all existing components, thereby avoiding the process of upgrading each one. This is referred to as "functionality enhancement augmentation".

Functionality completeness augmentation using Enterprise API Augmentation Program 150 and Enterprise API Augmentation Data 160 loads an augmentation component when the Enterprise API 340 gets a request for functionality from a component identified as missing one or more features required by Enterprise API 340. Feature availability is tracked through the use of a "feature flag", a feature flag identifies whether or not a component supports a specific feature. Enterprise API Augmentation Program 150 automatically catalogs all augmentation modules in Enterprise API Catalog 345, listing components corresponding to each feature flag. When an augmentation component is found that supports the feature requested, the augmentation component is loaded in order to provide the feature requested. For example, Oracle Component 308 is used by enterprise API 340 to access Oracle data stored on data storage device 358. In this example, assume that Oracle Component 308 lacks the features to provide certain data management functionality (e.g., "count of" database records). The Data Management Component 314 is an augmentation component supporting data management for Oracle data. When an application (330, 332, 334) requests services using Enterprise API 340 it may be determined that Oracle Component 308 does not support data management, but based upon Enterprise API Catalog 345 entries, it is determined that Data Management Component 314 does support data management for Oracle. In this case Enterprise API Augmentation Program 150 loads Data Management Component 314 for Enterprise API 340 to satisfy the functionality request made.

Functionality enhancement augmentation provides enhanced functionality across all components accessible through Enterprise API 340 by loading an augmentation component to respond to all requests for a specific common functionality missing from the components. For example, Thread Management Component 312 provides thread management for non-thread safe components. Enterprise API Augmentation Program 150 loads Thread Management Component 312 for Enterprise API 340 to satisfy the need for a common thread management implementation. This allows all components to share a commonly required functionality in an efficient way. Augmenting Enterprise API 340 with a common thread management implementation relieves individual component writers from the burden of providing a new implementation when the definition of Enterprise API 340 changes to require thread safe operations.

Functionality offered by components can change over time as new versions of the components are written and installed. Using Enterprise API Augmentation Program 150 new functionality provided by components is automatically recognized and cataloged, thus allowing native implementations of functionality to override augmentation implementations. Components may be rewritten to include new functionality and this new functionality will be automatically called. Function availability can be determined by using an application function call asking "do you support this functionality". If the function call receives an affirmative response, it is determined that the component does implement the requested functionality. No response, or a negative response provides a determination that the component does not implement the requested functionality. Components not implementing a specific functionality are augmented as previously described.

Figure 5:
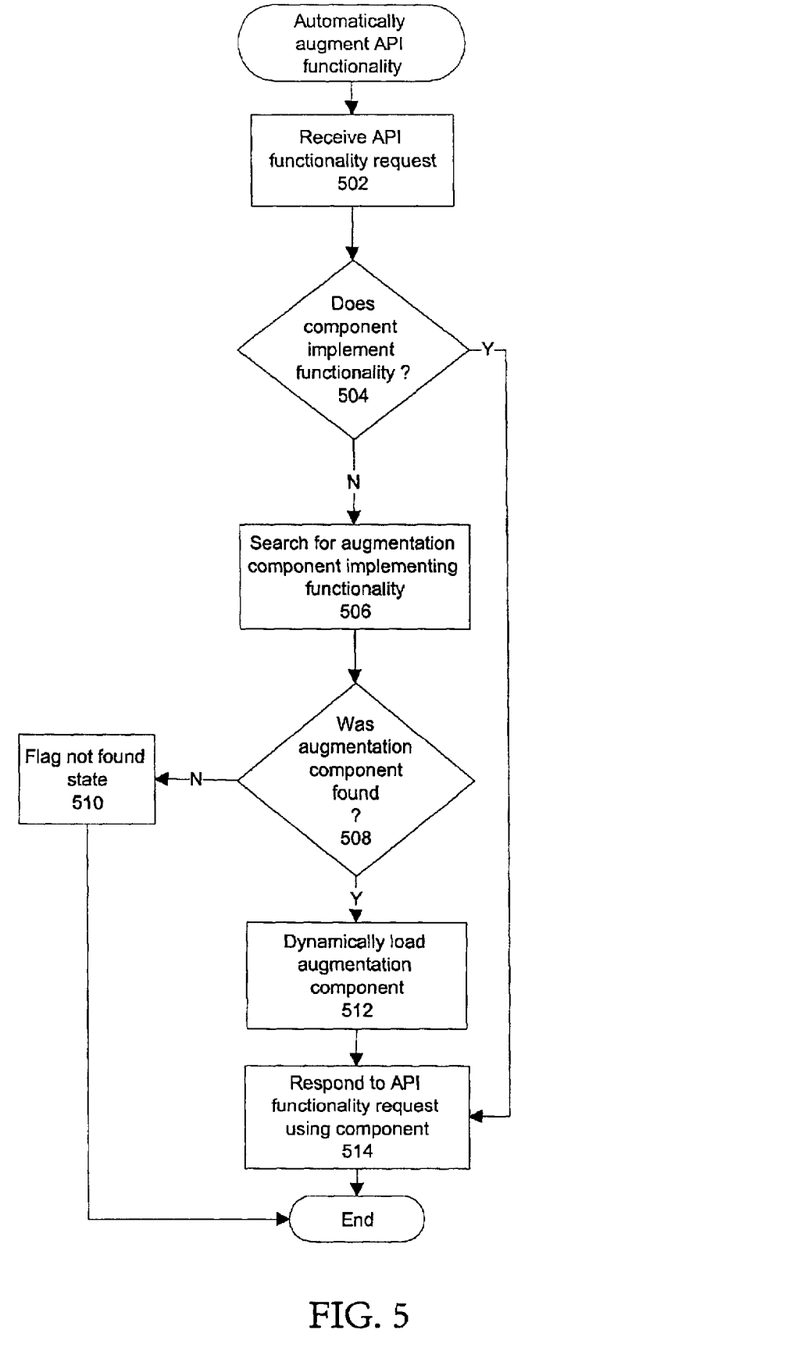
FIG. 5 is a flowchart of an embodiment of the present invention showing a method of automatically augmenting functionality in an application programming interface.

FIG. 5 is a flowchart of an embodiment of the present invention showing a method of automatically augmenting functionality in an application programming interface. The method starts at Step 502 where the enterprise API of the present invention receives a request for functionality. This request for functionality may be in the form of an SQL query on an Oracle database, for example "{count of {select name, address, phone where age>45}}". This query will produce a count of the number of database rows (result set) that match the query criteria. It can be the case that not all components of the enterprise API implement the "count of" functionality. Using the feature flag that associates features with components and the Enterprise API Catalog 345, a determination is made as to whether the needed component (e.g., Oracle Component 308) implements the requested functionality (Step 504). If it is determined that the component does implement the functionality, the component is allowed to respond to the request for functionality (Step 514) using its own native implementation.

If it is determined that the component does not implement the functionality, a search for an augmentation component (e.g., Data Management Component 314) is initiated (Step 506). The search for augmentation components may occur on multiple locations, including on the server executing the enterprise API (e.g., Enterprise API Server 100), on any number of backend servers (e.g., Backend Server 120, Database Server 110), or on Web sites of various component vendors (e.g., www.oracle.com). For example, a Uniform Resource Locator (URL) can be used to direct the search for networks that use URLs to address resources. If an appropriate augmentation component is not found (Step 508), a "not found" flag is set (Step 510) such that the requestor is notified of the unavailability of the requested functionality. Otherwise, if an appropriate augmentation component is found (Step 508), the augmentation component is dynamically loaded (Step 512). The augmentation component is then used to respond to the request for functionality (Step 514), thus automatically augmenting features for component based application programming interfaces.

While this invention has been particularly shown and described with references to preferred embodiments thereof, it will be understood by those skilled in the art that various changes in form and details may be made therein without departing from the scope of the invention encompassed by the appended claims.

Applications have been described as enterprise applications, typically running on a client-server architecture. The present invention applies to augmenting APIs in any computer architecture including client-server, peer to peer and standalone applications. Additionally, the application need not be an enterprise application, the present invention applies to all applications accessing functionality through an application programming interface. For example, in a client-server architecture a memory 200 in a server computer stores computer software instructions (e.g., Enterprise API Augmentation Program 150) and data structures (Enterprise API Augmentation Data 160) used to implement an embodiment of the present invention. In a peer to peer architecture Enterprise API Augmentation Program 150 and Enterprise API Augmentation Data 160 may be stored in a memory 200 on various computers within the peer to peer network. In a standalone architecture a memory 200 in the standalone computer stores computer software instructions (e.g., Enterprise API Augmentation Program 150) and data structures (Enterprise API Augmentation Data 160) used to implement an embodiment of the present invention.

What is claimed is:

1. In an executing application program interface, a method of automatically augmenting functionality in the application programming interface comprising the steps of:
    receiving from an application a request for functionality to be fulfilled by a first component implementing at least a portion of the functionality within the application programming interface; and
    in response to the received request:
        querying the first component for the requested functionality;
        receiving an indication from the first component that the requested functionality is not implemented by the first component;
        searching for an augmentation component that implements the requested functionality;
        loading the augmentation component to fulfill the request for functionality in place of the first component; and
        responding to the request for functionality using the loaded augmentation component.

2. The method of claim 1 wherein the searching step comprises looking for the augmentation component on a computer system executing the application.

3. The method of claim 1 wherein the searching step comprises looking for the augmentation component on a network connected to a computer system executing the application.

4. The method of claim 3 wherein the network uses a Uniform Resource Locator to address resources and the searching step uses the Uniform Resource Locator to direct the search.

5. The method of claim 1 wherein the querying, receiving and searching steps create and maintain a catalog of available augmentation component functionality, the catalog being used to determine whether an augmentation component that implements the requested functionality exists.

6. The method of claim 5 wherein the catalog is created upon a first request for functionality.

7. The method of claim 5 wherein the catalog is recreated upon a specific request.

8. The method of claim 1 wherein the first component is a connector for accessing information stored in databases, file systems, Enterprise Resource Planning systems or transaction systems.

9. An apparatus for automatically augmenting functionality in an executing application programming interface comprising:
    an application programming interface module receiving from an application a request for functionality to be fulfilled by a first component implementing at least a portion of the functionality within the application programming interface;
    a query unit within the application programming interface module querying in response to the received request the first component for the requested functionality;
    a receiver within the application programming interface module receiving an indication from the first component that the requested functionality is not implemented by the first component;
    a search unit within the application programming interface module searching for an augmentation component that implements the requested functionality;
    a loader within the application programming interface module loading the augmentation component to fulfill the request for functionality in place of the first component; and
    a response unit within the application programming interface module responding to the request for functionality using the loaded augmentation component.

10. The apparatus of claim 9 wherein the search unit comprises looking for the augmentation component on a computer system executing the application.

11. The apparatus of claim 9 wherein the search unit comprises looking for the augmentation component on a network connected to a computer system executing the application.

12. The apparatus of claim 11 wherein the network uses a Uniform Resource Locator to address resources and the search unit uses the Uniform Resource Locator to direct the search.

13. The apparatus of claim 9 wherein the receiver, the query unit, and the search unit create and maintain a catalog of available augmentation component functionality, the catalog being used to determine whether an augmentation component that implements the requested functionality exists.

14. The apparatus of claim 13 wherein the catalog is created upon a first request for functionality.

15. The apparatus of claim 13 wherein the catalog is recreated upon a specific request.

16. The apparatus of claim 9 wherein the first component is a connector for accessing information stored in databases, file systems, Enterprise Resource Planning systems or transaction systems.

17. An apparatus for automatically augmenting functionality in an executing application programming interface comprising:
- means for receiving from an application a request for functionality to be fulfilled by a first component implementing at least a portion of the functionality within the application programming interface;
- means for querying in response to the received request the first component for the requested functionality;
- means for receiving an indication from the first component that the requested functionality is not implemented by the first component;
- means for searching for an augmentation component that implements the requested functionality;
- means for loading the augmentation component to fulfill the request for functionality in place of the first component; and
- means for responding to the request for functionality using the loaded augmentation component.

18. A computer program product comprising:
- a computer usable medium for automatically augmenting functionality in an executing application programming interface;
- a set of computer program instructions embodied on the computer usable medium, including instructions to:
  - receive from an application a request for functionality to be fulfilled by a first component implementing at least a portion of the functionality within the application programming interface; and
  - in response to the received request:
    - query the first component for the requested functionality;
    - receive an indication from the first component that the requested functionality is not implemented by the first component;
    - search for an augmentation component that implements the requested functionality;
    - load the augmentation component to fulfill the request for functionality in place of the first component; and
    - respond to the request for functionality using the loaded augmentation component.

19. A computer data signal embodied in a carrier wave comprising a code segment for automatically augmenting functionality in an executing application programming interface, including instructions to:
- receive from an application a request for functionality to be fulfilled by a first component implementing at least a portion of the functionality within the application programming interface; and
- in response to the received request:
  - query the first component for the requested functionality;
  - receive an indication from the first component that the requested functionality is not implemented by the first component;
  - search for an augmentation component that implements the requested functionality;
  - load the augmentation component to fulfill the request for functionality in place of the first component; and
  - respond to the request for functionality using the loaded augmentation component.

* * * * *